(12) United States Patent
Yeh et al.

(10) Patent No.: US 10,816,033 B2
(45) Date of Patent: Oct. 27, 2020

(54) BEARING STRUCTURE

(71) Applicant: Delta Electronics, Inc., Taoyuan (TW)

(72) Inventors: Ching-Hsien Yeh, Taoyuan (TW); Chih-Wei Chan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 81 days.

(21) Appl. No.: 16/148,268

(22) Filed: Oct. 1, 2018

(65) Prior Publication Data
US 2019/0136908 A1  May 9, 2019

(30) Foreign Application Priority Data
Nov. 3, 2017 (CN) .......................... 2017 1 1068335

(51) Int. Cl.
*F16C 17/10* (2006.01)
*F16C 33/10* (2006.01)
*F16C 32/06* (2006.01)

(52) U.S. Cl.
CPC ........ *F16C 17/102* (2013.01); *F16C 32/0662* (2013.01); *F16C 33/107* (2013.01); *F16C 33/1065* (2013.01)

(58) Field of Classification Search
CPC ...... F16C 17/026; F16C 17/102; F16C 32/06; F16C 32/0685; F16C 33/107; F16C 33/1065
USPC ........ 384/101, 114–115, 120, 123, 276, 291, 384/112, 292
See application file for complete search history.

(56) References Cited

U.S. PATENT DOCUMENTS

| | | | |
|---|---|---|---|
| 4,961,122 A | 10/1990 | Sakai et al. | |
| 5,273,368 A * | 12/1993 | Asada | F16C 17/026 384/113 |
| 5,908,247 A * | 6/1999 | Leuthold | F16C 17/102 384/107 |
| 5,998,898 A * | 12/1999 | Fukutani | F16C 17/045 310/90 |
| 6,250,807 B1* | 6/2001 | Mori | F16C 17/026 384/100 |

(Continued)

FOREIGN PATENT DOCUMENTS

| | | | | |
|---|---|---|---|---|
| WO | WO-2012105280 A1 * | 8/2012 | ............ | F16C 32/06 |
| WO | WO-2013046083 A1 * | 4/2013 | ............ | F16C 33/109 |

*Primary Examiner* — Marcus Charles
(74) *Attorney, Agent, or Firm* — Muncy, Geissler, Olds & Lowe, P.C.

(57) ABSTRACT

A bearing structure includes a plurality of wave-shaped grooves and an inner surface. The wave-shaped grooves are formed on the inner surface for receiving a lubricating fluid. Each of the wave-shaped grooves extends along a longitudinal axis of the bearing structure. Each of the wave-shaped grooves includes a first peak section, a second peak section, two first connecting sections, two second connecting sections and a trough section. The two first connecting sections are connected to opposite sides of the first peak section, and the two second connecting sections are connected to opposite sides of the second peak section. The trough section is disposed between the first peak section and the second peak section, and the trough section is connected to one of the first connecting sections and one of the second connecting sections. The first and second peak sections and the trough section have a circular arc structure.

18 Claims, 8 Drawing Sheets

(56) References Cited

U.S. PATENT DOCUMENTS

| | | | | |
|---|---|---|---|---|
| 6,296,390 | B1* | 10/2001 | Wolff | F16C 17/026 384/112 |
| 7,345,392 | B2* | 3/2008 | Hafen | F16C 17/102 310/90 |
| 7,431,506 | B2* | 10/2008 | Huang | F16C 17/02 384/107 |
| 7,441,957 | B2* | 10/2008 | Hong | F16C 17/026 384/100 |
| 7,465,098 | B2* | 12/2008 | Hendriks | F16C 17/107 384/100 |
| 7,699,529 | B2* | 4/2010 | Engesser | F16C 33/107 384/115 |
| 8,157,447 | B2* | 4/2012 | Aiello | F16C 17/026 384/123 |
| 8,300,355 | B2* | 10/2012 | Yang | F16C 17/107 360/271.3 |
| 8,628,246 | B2* | 1/2014 | Aiello | F16C 33/1065 384/123 |
| 2002/0009242 | A1* | 1/2002 | Okamura | F16C 17/026 384/114 |
| 2006/0002640 | A1* | 1/2006 | Chen | F16C 33/107 384/100 |
| 2008/0205804 | A1* | 8/2008 | Jeng | F16C 17/107 384/123 |
| 2011/0051591 | A1* | 3/2011 | Yang | F16C 17/107 369/264 |
| 2013/0129506 | A1* | 5/2013 | Nguyen-Schaefer | F16C 17/18 415/229 |

* cited by examiner

BEARING STRUCTURE

CROSS REFERENCE TO RELATED APPLICATIONS

This application claims the benefit of China Patent Application No. 201711068335.7, filed Nov. 3, 2017, the entirety of which is incorporated by reference herein.

BACKGROUND OF THE DISCLOSURE

Field of the Disclosure

The present disclosure relates to a bearing structure, and more particularly to a bearing structure with specific grooves.

Description of the Related Art

In the design of today's motors, fluid bearings are increasingly being applied to small motors. A typical motor includes a main shaft and a bearing structure coupled to the main shaft, and a spaced distance is formed between the bearing structure and the main shaft, so as to receive a lubricating fluid, such as lubricating oil. There are a plurality of grooves formed on the bearing structure or the main shaft, so that the lubricating fluid can generate a fluid film to provide a sufficient pressure to support the main shaft when the main shaft rotates relative to the bearing structure at a preset speed. Because the main shaft is not in direct contact with the bearing structure, this design has advantages of low wear and low noise.

Generally speaking, most current grooves are designed as V-shaped grooves, so that the fluid film can provide the maximum supporting pressure to support the main shaft when the main shaft rotates relative to the bearing structure. However, when a motor with these kinds of grooves undergoes a non-continuous and non-steady-state rotating test, the design of these grooves may generate a reverse film resistance when the rotating speed of the main shaft is extremely reduced. If the reverse film resistance is greater than the current supporting pressure provided by the fluid film, an unstable disturbance may be generated, resulting in friction between the main shaft and the bearing structure, and therefore the lifespan of the motor is affected.

BRIEF SUMMARY OF THE DISCLOSURE

Accordingly, one objective of the present disclosure is to provide a bearing structure to solve the problems described above.

According to some embodiments of the disclosure, a bearing structure is provided for supporting a rotating shaft, and the bearing structure includes a plurality of wave-shaped grooves and an inner surface. The wave-shaped grooves are formed on the inner surface in order, and are configured to receive a lubricating fluid. Each of the wave-shaped grooves extends along a longitudinal axis of the bearing structure. Each of the wave-shaped grooves includes a first peak section, a second peak section, two first connecting sections, two second connecting sections and a trough section. The two first connecting sections are connected to two sides of the first peak section, and the two second connecting sections are connected to two sides of the second peak section. The trough section is disposed between the first peak section and the second peak section, and the trough section is connected to one of the two first connecting sections and one of the two second connecting sections. At least one of the first peak section, the second peak section and the trough section is a circular arc structure.

In some embodiments, the first peak section includes a first apex, the second peak section includes a second apex, a spaced distance D is formed between the first apex and the second apex along a circumferential direction of the inner surface, and $D=(\pi*Rs)/N$, wherein Rs is a radius of the inner surface of the bearing structure, and N is the number of wave-shaped grooves arranged along the circumferential direction of the inner surface.

In some embodiments, the trough section includes a third apex, a first distance is formed between the third apex and the first apex along the longitudinal axis, a second distance is formed between the third apex and the second apex along the longitudinal axis, and the first distance is equal to the second distance.

In some embodiments, the trough section includes a third apex, a first distance is formed between the third apex and the first apex along the longitudinal axis, a second distance is formed between the third apex and the second apex along the longitudinal axis, and the first distance is not equal to the second distance.

In some embodiments, the trough section has a radius, and the radius is equal to 0.15 to 0.4 times the sum of the first distance and the second distance.

In some embodiments, the bearing structure includes an upper boundary and a lower boundary, the trough section includes an apex, a distance between the apex and the upper boundary along the longitudinal axis is equal to a distance between the apex and the lower boundary along the longitudinal axis.

In some embodiments, the bearing structure includes an upper boundary and a lower boundary, the trough section includes an apex, a distance between the apex and the upper boundary along the longitudinal axis is not equal to a distance between the apex and the lower boundary along the longitudinal axis.

In some embodiments, the trough section includes an apex, the apex is located on a reference plane which is perpendicular to the longitudinal axis, a first angle is formed between the first connecting section and the reference plane, and a second angle is formed between the second connecting section and the reference plane.

In some embodiments, the first angle is equal to the second angle.

In some embodiments, the sum of the first angle and the second angle ranges from 30 to 45 degrees.

According to another embodiment of the disclosure, the present disclosure provides another bearing structure for supporting a rotating shaft. The bearing structure includes an inner surface, a first groove group, a second groove group, and a separating portion. The first groove group is formed on the inner surface, and the first groove group includes a plurality of first grooves. Each of the first grooves includes a first circular arc section, a first connecting section, and a second connecting section, and the first connecting section and the second connecting section are connected to two sides of the first circular arc section. The second groove group is formed on the inner surface, and the second groove group includes a plurality of second grooves. Each of the second grooves includes a second circular arc section, a third connecting section and a fourth connecting section, and the third connecting section and the fourth connecting section are connected to two sides of the second circular arc section. The separating portion is connected to the first groove group and the second groove group, and the first groove group, the second groove group and the separating portion are configured to receive a lubricating fluid.

In some embodiments, the first groove group includes a first width, the second groove group includes a second width, and the first width is equal to the second width.

In some embodiments, the first groove group includes a first width, the second groove group includes a second width, and the first width is not equal to the second width.

In some embodiments, the first groove group includes an upper boundary and a lower boundary, the first circular arc section includes an apex, a distance between the apex and the upper boundary along a longitudinal axis of the bearing structure is equal to a distance between the apex and the lower boundary along the longitudinal axis.

In some embodiments, the first groove group includes an upper boundary and a lower boundary, the first circular arc section includes an apex, a distance between the apex and the upper boundary along a longitudinal axis of the bearing structure is not equal to a distance between the apex and the lower boundary along the longitudinal axis.

In some embodiments, the first groove group includes a first width, the first circular arc section includes a first radius, and the first radius is 0.15 to 0.4 times the first width.

In some embodiments, a reference plane is perpendicular to a longitudinal axis of the bearing structure, a first angle is formed between the first connecting section and the reference plane, and a second angle is formed between the second connecting section and the reference plane, and the first angle is equal to the second angle.

In some embodiments, the sum of the first angle and the second angle ranges from 30 to 45 degrees.

In some embodiments, the first circular arc section includes a first apex, the second circular arc section includes a second apex, a spaced distance D is formed between the first apex and the second apex along a circumferential direction of the inner surface, and D=0 or $(\pi*Rs)/N$, wherein Rs is a radius of the bearing structure, and N is the number of first grooves arranged along the circumferential direction of the inner surface.

According to another embodiment of the disclosure, a bearing structure for supporting a rotating shaft is provided. The bearing structure includes a plurality of grooves, arranged in order and configured to receive a lubricating fluid, and each of the grooves includes a circular arc section and two non-circular arc sections connected to the circular arc section.

In conclusion, the present disclosure provides a bearing structure including at least one groove group. Each of the grooves includes at least one circular arc section, so that the lubricating fluid in the groove flows to the circular arc section to generate a sufficient supporting pressure when the rotating shaft rotates relative to the bearing structure. In addition, when the rotating speed of the rotating shaft is extremely reduced, the film resistance generated by the lubricating fluid is still less than the supporting pressure, so that the rotating shaft can still stably rotate without being in contact with the inner surface of the bearing structure. Furthermore, when the groove includes two circular arc sections, a spaced distance is formed between the two circular arc sections. Based on this configuration, stability can be increased when the rotating shaft rotates relative to the bearing structure.

A bearing structure in the prior art adopts a design with a V-shaped groove, and when the rotating speed of the rotating shaft is extremely reduced, a great amount of film resistance is generated, causing friction between the rotating shaft and the conventional bearing structure and reducing the lifespan. On the other hand, based on a design with an oval-shaped groove adopted in another bearing structure in the prior art, the supporting pressure generated by the lubricating fluid is not able to support the rotating shaft to bear a greater load. In contrast to the prior art, the design of the grooves of the present disclosure can solve the problems of the greater film resistance generated by the V-shaped groove and the insufficient supporting pressure generated by the oval-shaped groove at the same time.

DETAILED DESCRIPTION OF THE ILLUSTRATIVE EMBODIMENTS

Figure 1:
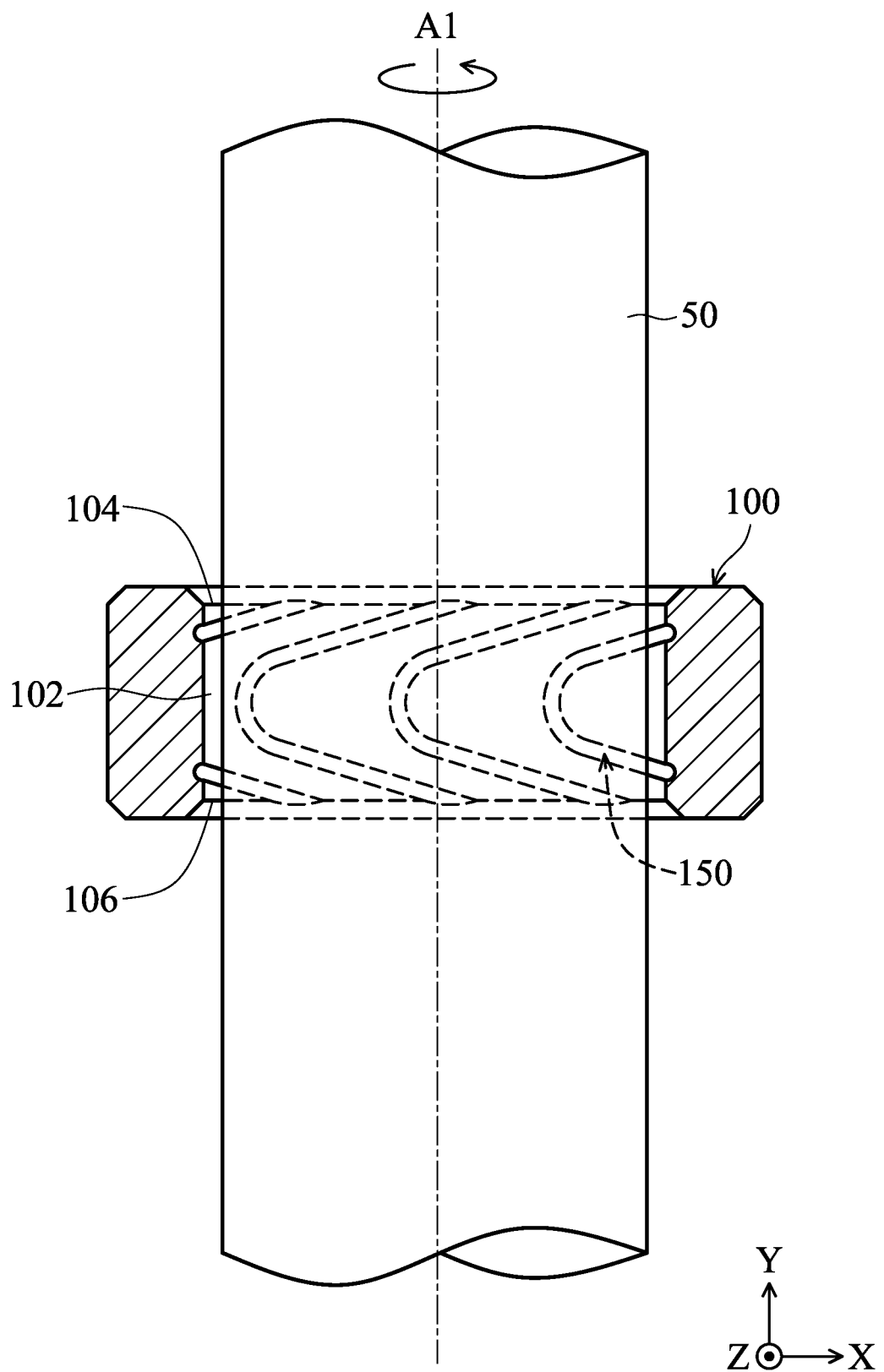
FIG. 1 shows a schematic diagram of a bearing structure and a rotating shaft according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, the use of the directional terms is for description only and is not intended to limit the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

Please refer to FIG. 1, which shows a schematic diagram of a bearing structure 100 and a rotating shaft 50 according to an embodiment of the present disclosure. As shown in FIG. 1, some portions of the rotating shaft 50 are omitted for clarity, and the bearing structure 100 is illustrated in a cross-sectional view. In this embodiment, the bearing structure 100 and the rotating shaft 50 can be applied to various motor. The bearing structure 100 is a part of the stator of the motor, and the bearing structure 100 is a part of the rotor. In this embodiment, the rotating shaft 50 is disposed in the bearing structure 100. In addition, a lubricating fluid (not shown in figures) can be provided between the rotating shaft 50 and the bearing structure 100, so that the rotating shaft 50 can rotate relative to the bearing structure 100. As shown in FIG. 1, a longitudinal axis A1 of the bearing structure 100 is parallel to the Y-axis, and the rotating shaft 50 rotates in an arrow direction in FIG. 1 around the longitudinal axis A1 relative to the bearing structure 100.

Figure 2:
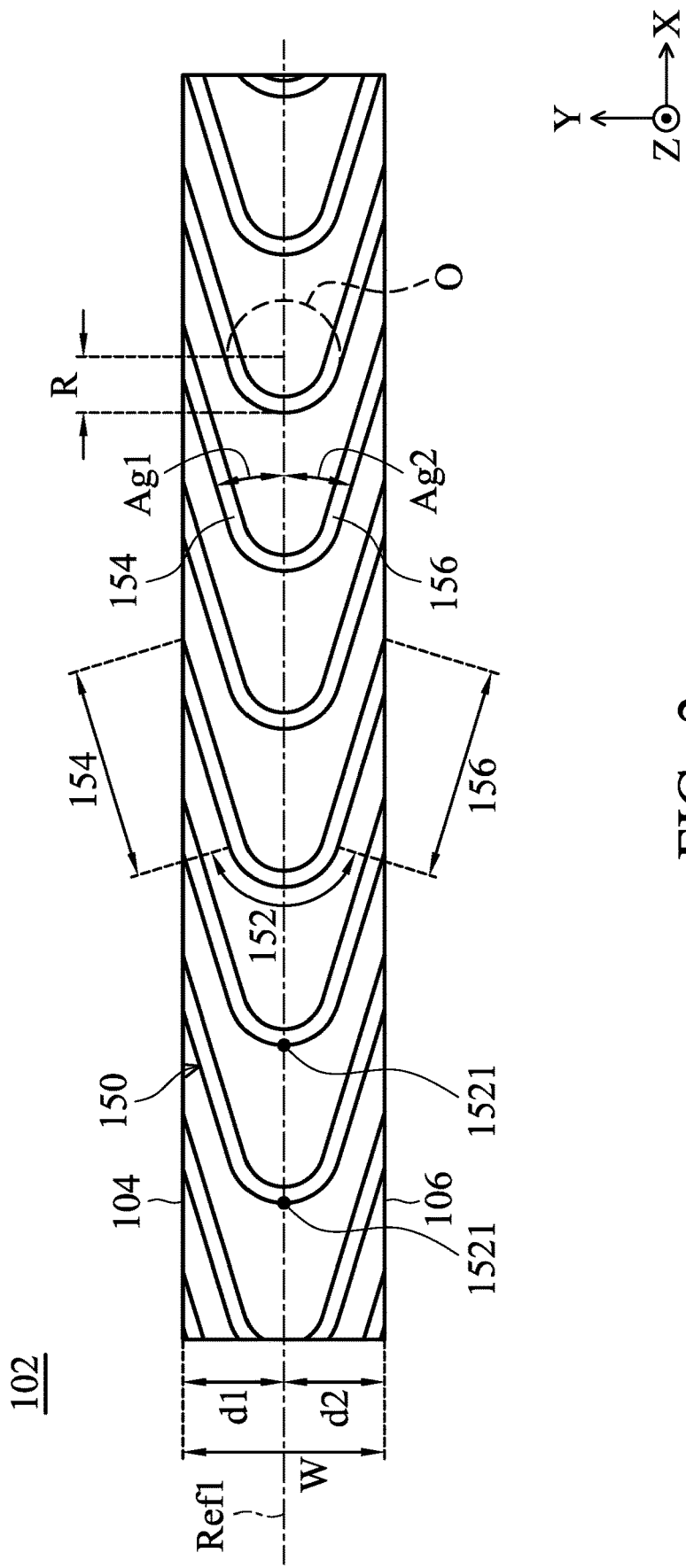
FIG. 2 illustrates a planar view of the inner surface of the bearing structure in FIG. 1 according to the embodiment of the present disclosure.

Please refer to FIG. 1 and FIG. 2. FIG. 2 illustrates a planar view of the inner surface 102 of the bearing structure 100 in FIG. 1 according to the embodiment of the present disclosure. As shown in FIG. 1 and FIG. 2, the bearing structure 100 of the present disclosure includes a plurality of grooves 150 which are arranged in order and are formed on the ring-shaped inner surface 102, such as being arranged with a fixed spacing, and the lubricating fluid can be received within the grooves 150. In this embodiment, each of the grooves 150 includes a circular arc section 152, a first connecting section 154 and a second connecting section 156, and the first connecting section 154 and the second connecting section 156 are respectively connected to two sides of the circular arc section 152. In this embodiment, the first connecting section 154 and the second connecting section 156 are non-circular arc sections. For example, the first connecting section 154 and the second connecting section 156 can be straight sections.

As shown in FIG. 2, the inner surface 102 of the bearing structure 100 includes an upper boundary 104 and a lower boundary 106, and a width W is formed between the upper boundary 104 and the lower boundary 106. It should be noted that the circular arc section 152 includes an apex 1521, a distance d1 is formed between the apex 1521 and the upper boundary 104 along the Y-axis direction, and a distance d2 is formed between the apex 1521 and the lower boundary 106 along the Y-axis direction. In this embodiment, the distance d1 can be equal to or not equal to the distance d2. In addition, in this embodiment, the circular arc section 152 corresponds to an circular arc of a circle O, and the circle O includes a radius R. The radius R may be 0.15 to 0.4 times the width W.

In addition, as shown in FIG. 2, those apexes 1521 of the grooves 150 are located on a reference plane Ref1, and the reference plane Ref1 is perpendicular to the Y-axis. A first angle Ag1 is formed between the first connecting section 154 and the reference plane Ref1, and a second angle Ag2 is formed between the second connecting section 156 and the reference plane Ref1. The first angle Ag1 is equal to the second angle Ag2. In this embodiment, the sum of the first angle Ag1 and the second angle Ag2 ranges from 30 to 45 degrees, but it is not limited thereto.

When the rotating shaft 50 rotates relative to the bearing structure 100, the lubricating fluid generates a fluid film between the rotating shaft 50 and the bearing structure 100, and the lubricating fluid is driven from the first connecting section 154 and the second connecting section 156 to the circular arc section 152 due to the rotation of the rotating shaft 50, so as to provide a sufficient supporting pressure for the rotating shaft 50. Because the circular arc section 152 of the present disclosure is circular-shaped structure, when the rotating speed of the rotating shaft 50 is extremely reduced, the film resistance generated by the lubricating fluid is still less than the supporting pressure, so that the rotating shaft 50 can still stably rotate relative to the bearing structure 100 without being in contact with the inner surface 102 of the bearing structure 100. As a result, based on the design of the grooves 150 of the present disclosure, the problem of a greater film resistance generated by a V-shaped groove in a conventional bearing structure causing friction between the rotating shaft and the conventional bearing structure and reducing the lifespan can be prevented.

Figure 3:
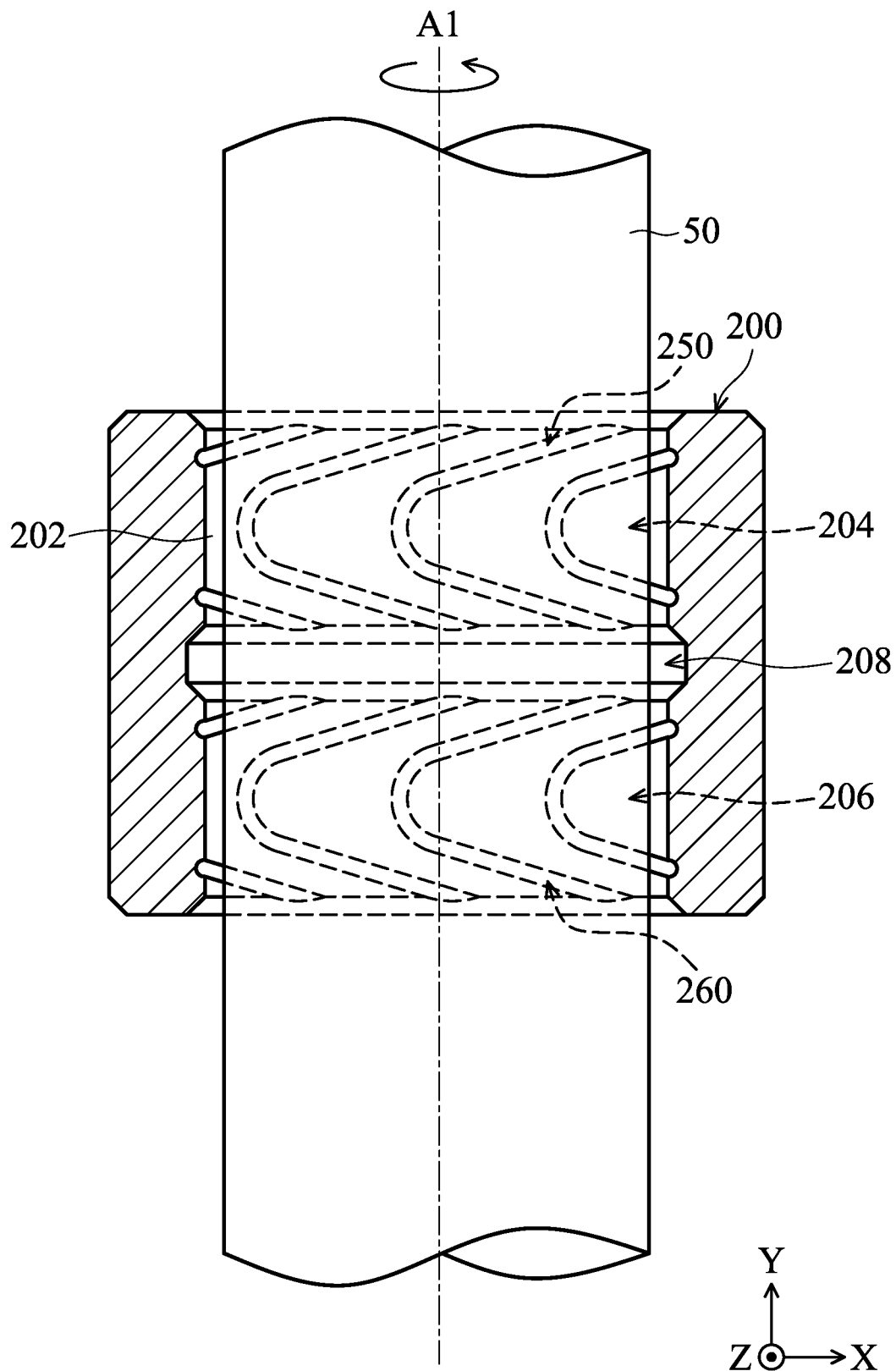
FIG. 3 shows a schematic diagram of a bearing structure and a rotating shaft according to another embodiment of the present disclosure.
Figure 4:
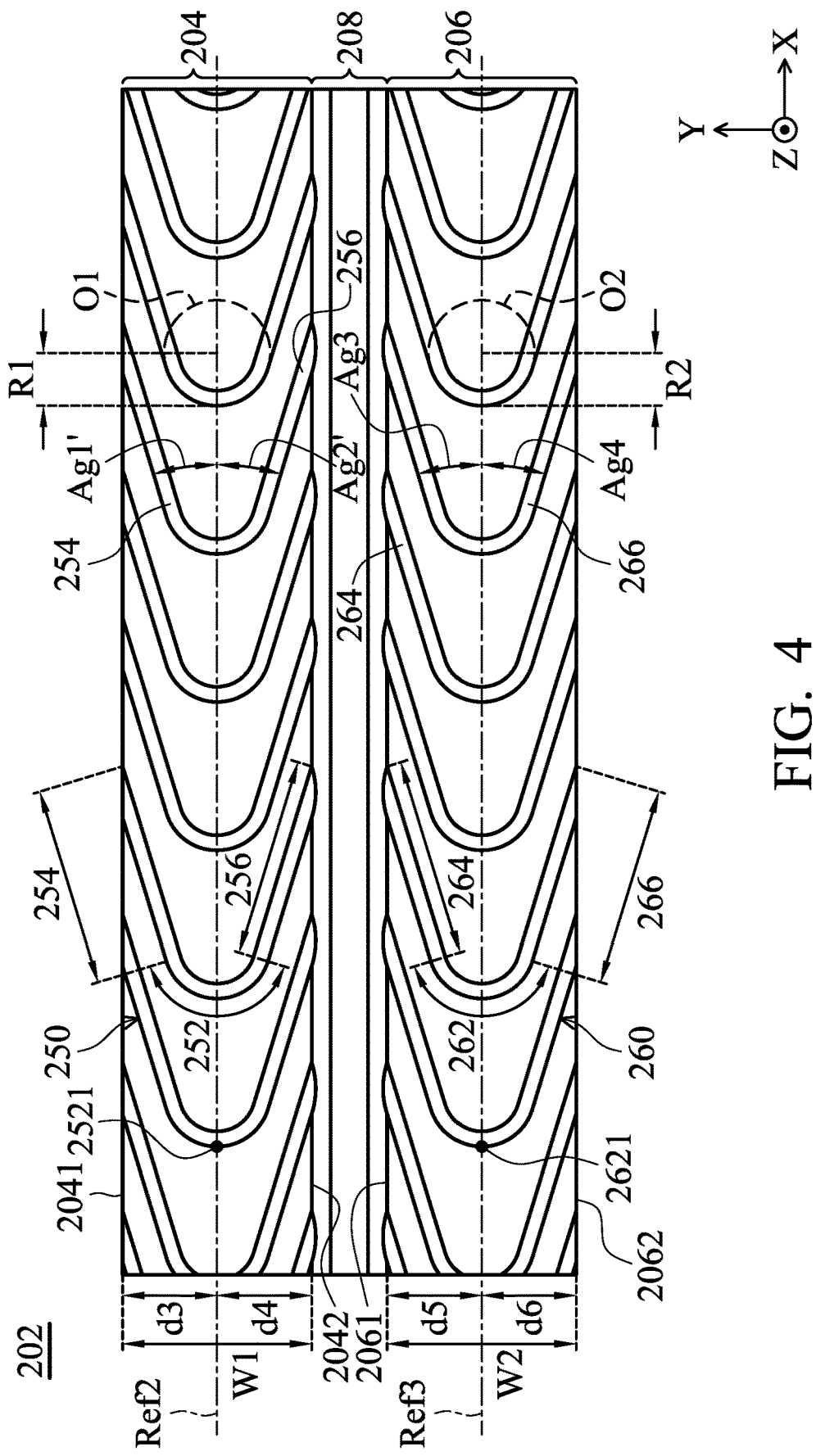
FIG. 4 illustrates a planar view of the inner surface of the bearing structure in FIG. 3 according to the embodiment of the present disclosure.

Please refer to FIG. 3 and FIG. 4. FIG. 3 shows a schematic diagram of a bearing structure 200 and a rotating shaft 50 according to another embodiment of the present disclosure. FIG. 4 illustrates a planar view of the inner surface 202 of the bearing structure 200 in FIG. 3 according to the embodiment of the present disclosure. The longitudinal axis A1 of the bearing structure 200 is parallel to the Y-axis, and the rotating shaft 50 can rotate around the longitudinal axis A1 relative to the bearing structure 200. In this embodiment, the bearing structure 200 includes the inner surface 202, a first groove group 204, a second groove group 206 and a concave separating portion 208. The first groove group 204 and the second groove group 206 are formed on the inner surface 202, and the separating portion 208 is formed on the inner surface 202 and is communicated with the first groove group 204 and the second groove group 206. The lubricating fluid can be received within the separating portion 208, the first groove group 204 and the second groove group 206.

As shown in FIG. 4, the first groove group 204 includes a first width W1, the second groove group 206 includes a second width W2. In this embodiment, the first width W1 is equal to the second width W2, but the first width W1 can be not equal to the second width W2 in other embodiments. The first groove group 204 includes a plurality of first grooves 250 arranged in order. For example, the first grooves 250 are arranged with a fixed spacing in this embodiment. Each of the first grooves 250 includes a first circular arc section 252, a first connecting section 254 and a second connecting section 256, and the first connecting section 254 and the second connecting section 256 are connected to two sides of the first circular arc section 252. The second groove group 206 includes a plurality of second grooves 260 arranged in order. The number of second groove group 206 is equal to the number of first grooves 250. Each of the second grooves 260 includes a second circular arc section 262, a third connecting section 264 and a fourth connecting section 266, and the third connecting section 264 and the fourth connecting section 266 are connected to two sides of the second circular arc section 262.

Similar to the previous embodiment, the first circular arc section 252 corresponds to a circular arc of a circle O1, and the circle O1 includes a first radius R1. The first radius R1 may be 0.15 to 0.4 times the first width W1. The second circular arc section 262 corresponds to a circular arc of a circle O2, and the circle O2 includes a second radius R2. The second radius R2 may be 0.15 to 0.4 times the second width W2.

Each first circular arc section 252 includes a first apex 2521, and each second circular arc section 262 includes a second apex 2621. Those first apexes 2521 are located on a reference plane Ref2, those second apexes 2621 are located on a reference plane Ref3, and the reference plane Ref2 and the reference plane Ref3 are perpendicular to the Y-axis. A first angle Ag1' is formed between the first connecting section 254 and the reference plane Ref2, and a second angle Ag2' is formed between the second connecting section 256 and the reference plane Ref2. The first angle Ag1' is equal to the second angle Ag2'. In this embodiment, the sum of the first angle Ag1' and the second angle Ag2' ranges from 30 to 45 degrees, but it is not limited thereto. Similarly, a third angle Ag3 is formed between the third connecting section 264 and the reference plane Ref3, and a fourth angle Ag4 is formed between the fourth connecting section 266 and the reference plane Ref3. The third angle Ag3 is equal to the fourth angle Ag4, and the sum of the third angle Ag3 and the fourth angle Ag4 ranges from 30 to 45 degrees.

In addition, the first groove group 204 includes an upper boundary 2041 and a lower boundary 2042. A distance d3 is formed between the first apex 2521 and the upper boundary 2041 along the Y-axis direction, a distance d4 is formed between the first apex 2521 and the lower boundary 2042 along the Y-axis direction, and the distance d3 can be equal to or not equal to the distance d4. In this embodiment, the distance d3 is equal to the distance d4. In addition, the second groove group 206 includes an upper boundary 2061 and a lower boundary 2062. A distance d5 is formed between the second apex 2621 and the upper boundary 2061 along the Y-axis direction, a distance d6 is formed between the second apex 2621 and the lower boundary 2062 along the Y-axis direction, and the distance d5 can be equal to or not equal to the distance d6. In this embodiment, the distance d5 is equal to the distance d6.

When the rotating shaft 50 rotates relative to the bearing structure 200, the lubricating fluid generates a fluid film between the rotating shaft 50 and the bearing structure 200, and the lubricating fluid flows from the separating portion 208 along the second connecting section 256 and the third connecting section 264 to the first circular arc section 252 and the second circular arc section 262 respectively due to the rotation of the rotating shaft 50, and the lubricating fluid in the first connecting section 254 and the fourth connecting section 266 also flows to the first circular arc section 252 and the second circular arc section 262 respectively, so as to provide a sufficient supporting pressure for the rotating shaft 50 to stably rotate relative to the bearing structure 200. Because the first circular arc section 252 and the second circular arc section 262 are circular-shaped structures, when the rotating speed of the rotating shaft 50 is extremely reduced, the film resistance generated by the lubricating fluid is still less than the supporting pressure, so that the rotating shaft 50 can still stably rotate relative to the bearing structure 200 without being in contact with the inner surface 202 of the bearing structure 200.

Figure 5:
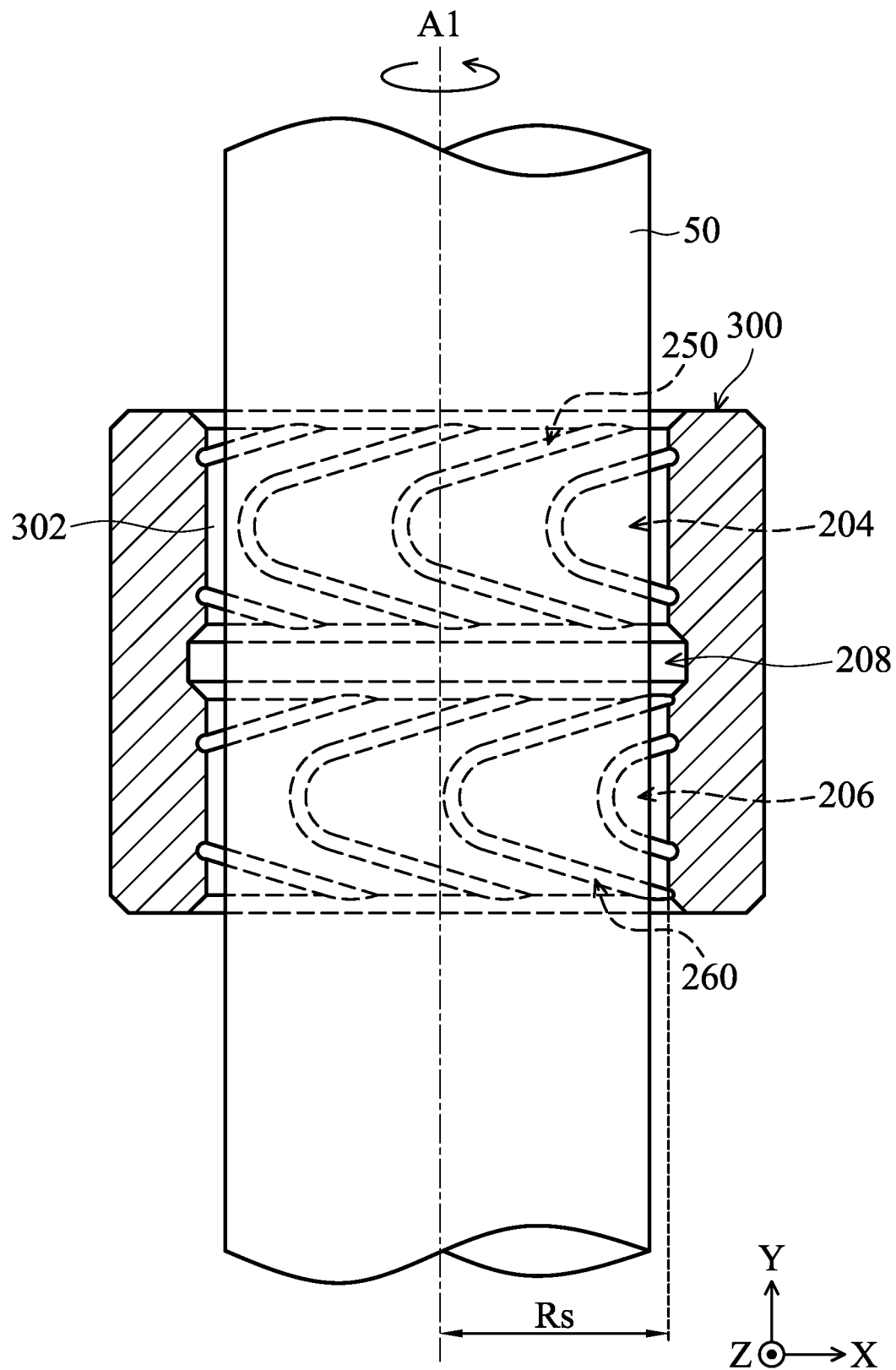
FIG. 5 shows a schematic diagram of a bearing structure and the rotating shaft according to another embodiment of the present disclosure.
Figure 6:
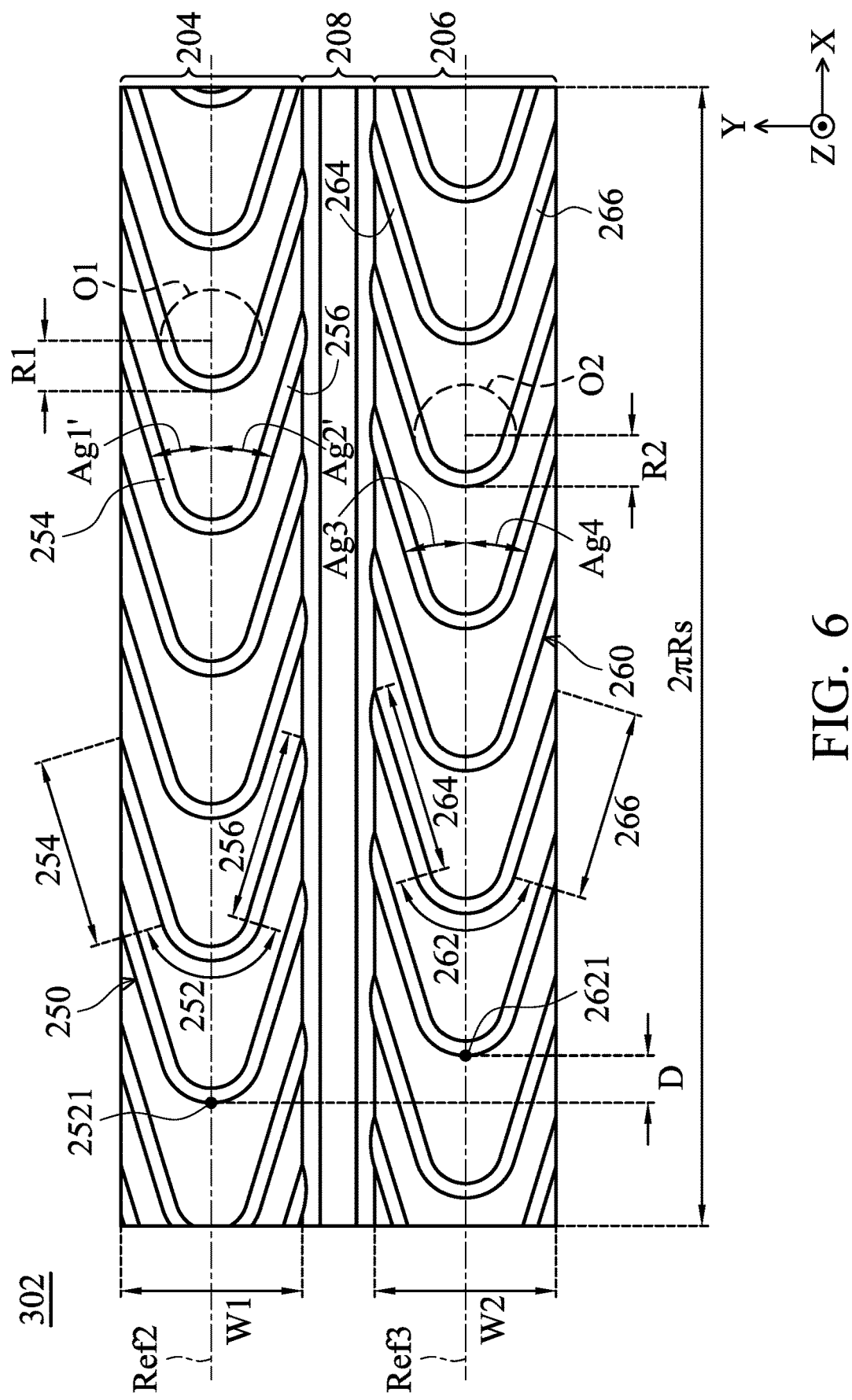
FIG. 6 illustrates a planar view of the inner surface of the bearing structure in FIG. 5 according to the embodiment of the present disclosure.

In addition, please refer to FIG. 5 and FIG. 6. FIG. 5 shows a schematic diagram of a bearing structure 300 and the rotating shaft 50 according to another embodiment of the present disclosure. FIG. 6 illustrates a planar view of an inner surface 302 of the bearing structure 300 in FIG. 5 according to the embodiment of the present disclosure. The bearing structure 300 is similar to the bearing structure 200, and the difference between the bearing structure 300 and the bearing structure 200 is that a spaced distance D is formed between the first apex 2521 and the second apex 2621 along a circumferential direction of the inner surface 302 as shown in FIG. 6. That is, the spaced distance D is formed between the first apex 2521 and the second apex 2621 along the X-axis. In this embodiment, the inner surface 302 of the bearing structure 300 includes a radius Rs (FIG. 5) and includes the first grooves 250 and the second grooves 260 whose number is N. The spaced distance D=($\pi$*Rs)/N. In this embodiment, the length of the inner surface 302 is 2$\pi$*Rs. Based on the design of the spaced distance D formed between the first apex 2521 and the second apex 2621, the stability can be increased when the rotating shaft 50 rotates relative to the bearing structure 300.

Figure 7:
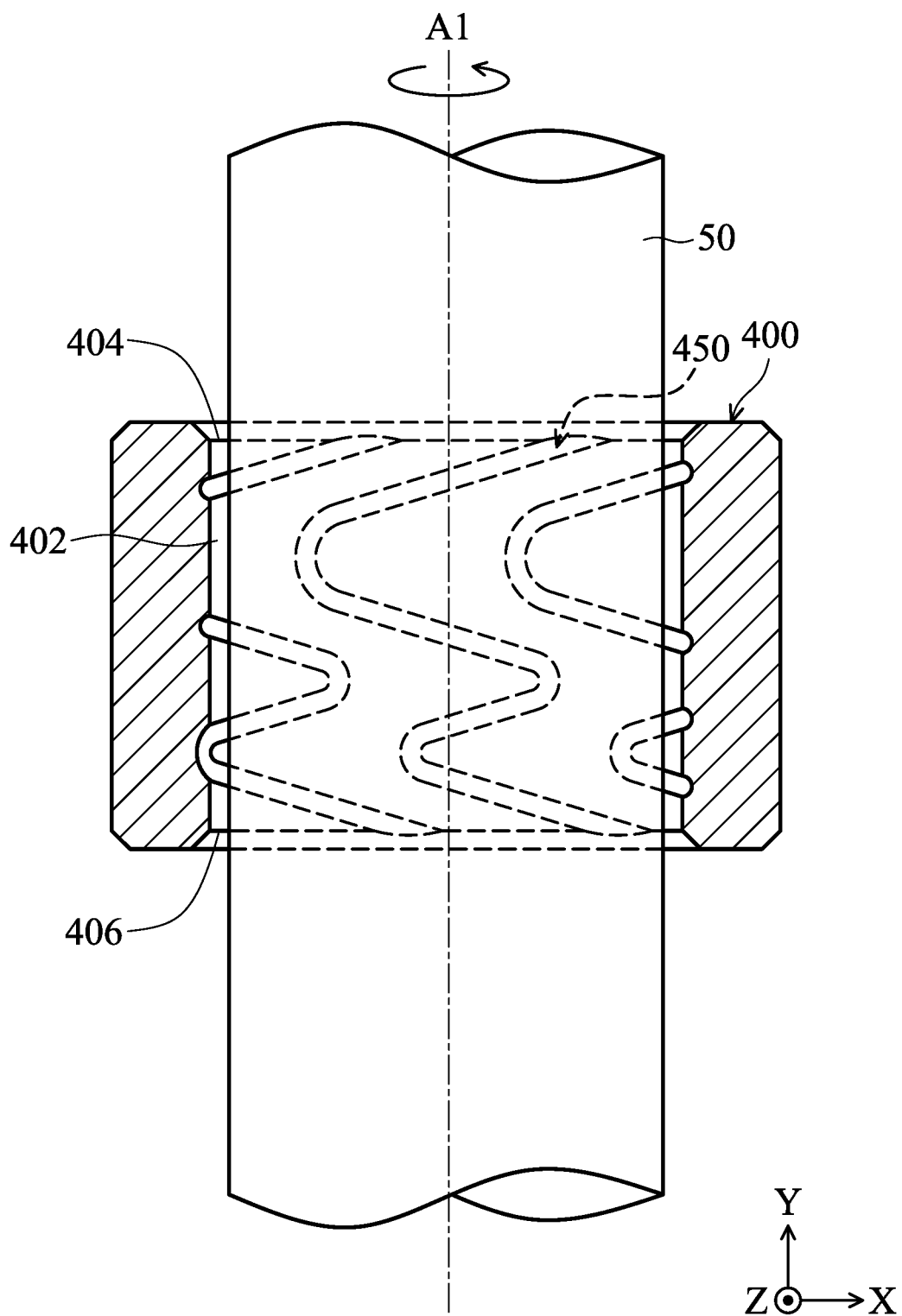
FIG. 7 shows a schematic diagram of a bearing structure and the rotating shaft according to another embodiment of the present disclosure.
Figure 8:
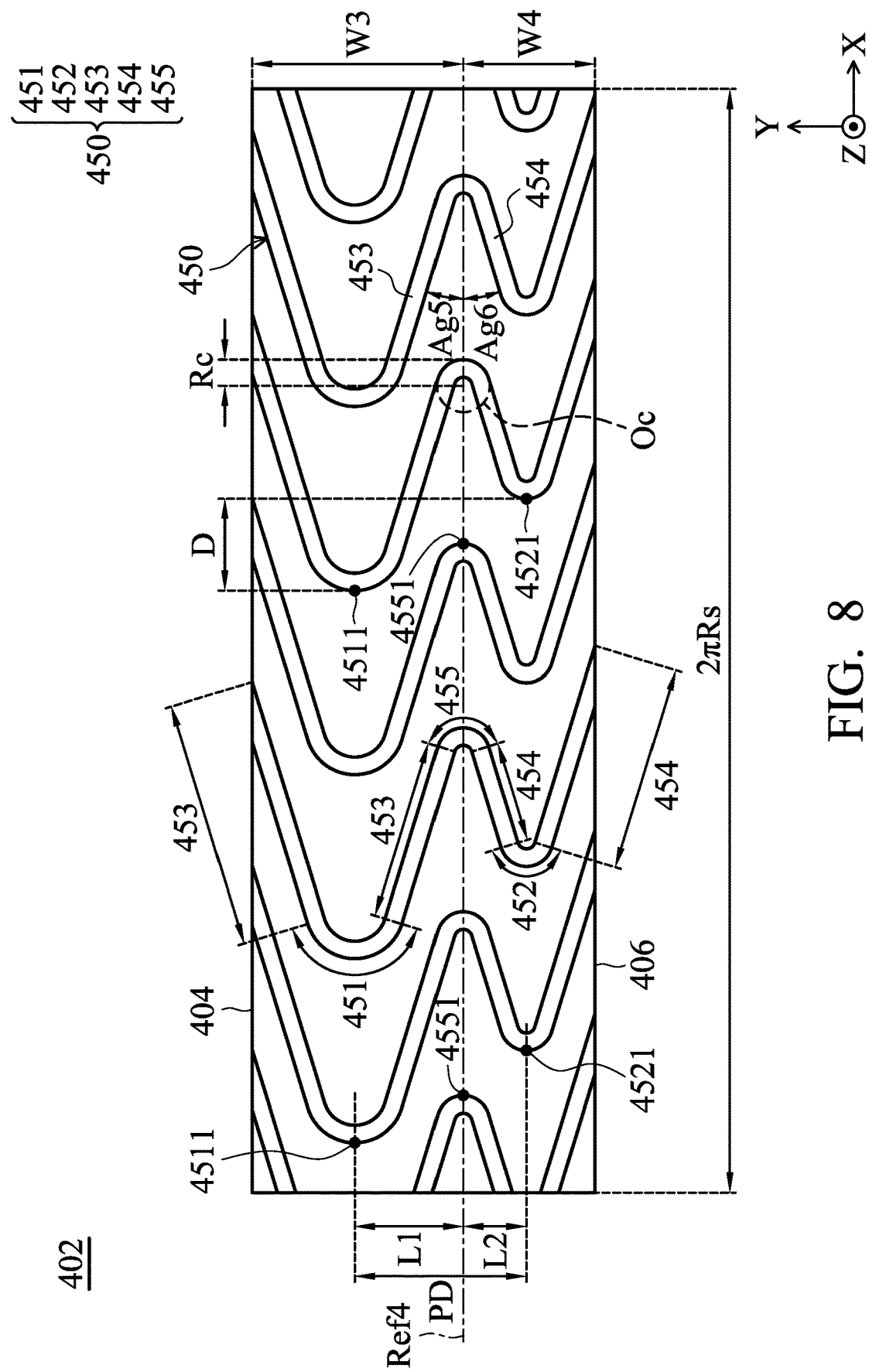
FIG. 8 illustrates a planar view of the inner surface of the bearing structure in FIG. 7 according to the embodiment of the present disclosure.

Please refer to FIG. 7 and FIG. 8. FIG. 7 shows a schematic diagram of a bearing structure 400 and the rotating shaft 50 according to another embodiment of the present disclosure. FIG. 8 illustrates a planar view of the inner surface 402 of the bearing structure 400 in FIG. 7 according to the embodiment of the present disclosure. In this embodiment, the longitudinal axis A1 of the bearing structure 400 is parallel to the Y-axis, and the bearing structure 400 includes the inner surface 402 and a plurality of wave-shaped grooves 450 arranged in order (such as being arranged with a fixed spacing in this embodiment). Each of the wave-shaped grooves 450 extends along the Y-axis and includes a first peak section 451, a second peak section 452, two first connecting sections 453, two second connecting sections 454 and a trough section 455. In this embodiment, the two first connecting sections 453 are connected to two sides of the first peak section 451, and the two second connecting sections 454 are connected to two sides of the second peak section 452. The trough section 455 is disposed between the first peak section 451 and the second peak section 452, and the trough section 455 is connected to one of the two first connecting sections 453 and one of the two second connecting sections 454. Specifically, in this embodiment, each of the first peak section 451, the second peak section 452 and the trough section 455 has a circular arc structure.

The first peak section 451 includes a first apex 4511, the second peak section 452 includes a second apex 4521, and the trough section 455 includes a third apex 4551. A first distance L1 is formed between the third apex 4551 and the first apex 4511 along the Y-axis, a second distance L2 is formed between the third apex 4551 and the second apex 4521 along the Y-axis, and a peak-to-peak distance PD is formed between the first apex 4511 and the second apex 4521 along the Y-axis. In this embodiment, the peak-to-peak distance PD is equal to the sum of the first distance L1 and the second distance L2, and the first distance L1 can be equal to or not equal to the second distance L2. In this embodiment, the first distance L1 is not equal to the second distance L2. The trough section 455 corresponds to an circular arc of a circle Oc, and the circle Oc includes a radius Rc. The radius Rc may be 0.15 to 0.4 times the peak-to-peak distance PD. In addition, those third apexes 4551 are located on a reference plane Ref4, and the reference plane Ref4 is perpendicular to the Y-axis. A first angle Ag5 is formed between the first connecting sections 453 and the reference plane Ref4, and a second angle Ag6 is formed between the second connecting sections 454 and the reference plane Ref4. In this embodiment, the first angle Ag5 is equal to the second angle Ag6, and the sum of the first angle Ag5 and the second angle Ag6 substantially ranges from 30 to 45 degrees.

It should be noted that the inner surface 402 of the bearing structure 400 includes a radius Rs and the wave-shaped grooves 450 whose number is N, and a spaced distance D is formed between first apex 4511 and the second apex 4521 along a circumferential direction of the inner surface 402. That is, as shown in FIG. 8, the spaced distance D is formed between the first apex 4511 and the second apex 4521 along the X-axis, and the spaced distance D=(π*Rs)/N. In this embodiment, the length of the inner surface 402 is 2π*Rs. Based on the design of the spaced distance D formed between the first apex 4511 and the second apex 4521, the stability can be increased when the rotating shaft 50 rotates relative to the bearing structure 400.

In addition, the inner surface 402 of the bearing structure 400 includes an upper boundary 404 and a lower boundary 406, a distance W3 formed between the third apex 4551 of the trough section 455 and the upper boundary 404 along the Y-axis can be equal to or not equal to a distance W4 formed between the third apex 4551 and the lower boundary 406 along the Y-axis.

In conclusion, the present disclosure provides a bearing structure including at least one groove group. Each of the grooves includes at least one circular arc section, so that the lubricating fluid in the groove flows to the circular arc section to generate a sufficient supporting pressure when the rotating shaft 50 rotates relative to the bearing structure. In addition, when the rotating speed of the rotating shaft 50 is extremely reduced, the film resistance generated by the lubricating fluid is still less than the supporting pressure, so that the rotating shaft 50 can still stably rotate without being in contact with the inner surface of the bearing structure. Furthermore, when the groove includes two circular arc sections, a spaced distance is formed between the two circular arc sections. Based on this configuration, stability can be increased when the rotating shaft 50 rotates relative to the bearing structure.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A bearing structure for supporting a rotating shaft, the bearing structure comprising:
a plurality of wave-shaped grooves and an inner surface, wherein the wave-shaped grooves are formed on the inner surface and are configured to receive a lubricating fluid, each of the wave-shaped grooves extends along a longitudinal axis of the bearing structure, and each of the wave-shaped grooves includes:
a first peak section;
a second peak section;
two first connecting sections, connected to two sides of the first peak section;
two second connecting sections, connected to two sides of the second peak section; and
a trough section, disposed between the first peak section and the second peak section, and the trough section is connected to one of the two first connecting sections and one of the two second connecting sections,
wherein at least one of the first peak section, the second peak section and the trough section is a circular arc structure,
wherein the first peak section includes a first apex, the second peak section includes a second apex, a spaced distance D is formed between the first apex and the second apex along a circumferential direction of the inner surface, and D=(π*Rs)/N, and
wherein Rs is a radius of the inner surface of the bearing structure, and N is the number of wave-shaped grooves arranged along the circumferential direction of the inner surface.

2. The bearing structure as claimed in claim 1, wherein the trough section includes a third apex, a first distance is formed between the third apex and the first apex along the longitudinal axis, a second distance is formed between the third apex and the second apex along the longitudinal axis, and the first distance is equal to the second distance.

3. The bearing structure as claimed in claim 1, wherein the trough section includes a third apex, a first distance is formed between the third apex and the first apex along the longitudinal axis, a second distance is formed between the third apex and the second apex along the longitudinal axis, and the first distance is not equal to the second distance.

4. The bearing structure as claimed in claim 3, wherein the trough section has a radius, and the radius is equal to 0.15 to 0.4 times the sum of the first distance and the second distance.

5. The bearing structure as claimed in claim 1, wherein the bearing structure includes an upper boundary and a lower boundary, the trough section includes an apex, a distance between the apex and the upper boundary along the longitudinal axis is equal to a distance between the apex and the lower boundary along the longitudinal axis.

6. The bearing structure as claimed in claim 1, wherein the bearing structure includes an upper boundary and a lower boundary, the trough section includes an apex, a distance between the apex and the upper boundary along the longitudinal axis is not equal to a distance between the apex and the lower boundary along the longitudinal axis.

7. The bearing structure as claimed in claim 1, wherein the trough section includes an apex, the apex is located on a reference plane which is perpendicular to the longitudinal axis, a first angle is formed between the first connecting section and the reference plane, and a second angle is formed between the second connecting section and the reference plane.

8. The bearing structure as claimed in claim 7, wherein the first angle is equal to the second angle.

9. The bearing structure as claimed in claim 8, wherein the sum of the first angle and the second angle ranges from 30 to 45 degrees.

10. A bearing structure for supporting a rotating shaft, the bearing structure comprising:
an inner surface;
a first groove group, formed on the inner surface, wherein the first groove group includes a plurality of first grooves, each of the first grooves includes a first circular arc section, a first connecting section and a second connecting section, and the first connecting section and the second connecting section are connected to two sides of the first circular arc section;

a second groove group, formed on the inner surface, wherein the second groove group includes a plurality of second grooves, each of the second grooves includes a second circular arc section, a third connecting section and a fourth connecting section, and the third connecting section and the fourth connecting section are connected to two sides of the second circular arc section; and a separating portion, connected to the first groove group and the second groove group, wherein the first groove group, the second groove group and the separating portion are configured to receive a lubricating fluid, wherein the first circular arc section includes a first apex, the second circular arc section includes a second apex, a spaced distance D is formed between the first apex and the second apex along a circumferential direction of the inner surface, and D=0 or (π*Rs)/N, and wherein Rs is a radius of the bearing structure, and N is the number of first grooves arranged along the circumferential direction of the inner surface.

11. The bearing structure as claimed in claim 10, wherein the first groove group includes a first width, the second groove group includes a second width, and the first width is equal to the second width.

12. The bearing structure as claimed in claim 10, wherein the first groove group includes a first width, the second groove group includes a second width, and the first width is not equal to the second width.

13. The bearing structure as claimed in claim 10, wherein the first groove group includes an upper boundary and a lower boundary, the first circular arc section includes an apex, a distance between the apex and the upper boundary along a longitudinal axis of the bearing structure is equal to a distance between the apex and the lower boundary along the longitudinal axis.

14. The bearing structure as claimed in claim 10, wherein the first groove group includes an upper boundary and a lower boundary, the first circular arc section includes an apex, a distance between the apex and the upper boundary along a longitudinal axis of the bearing structure is not equal to a distance between the apex and the lower boundary along the longitudinal axis.

15. The bearing structure as claimed in claim 10, wherein the first groove group includes a first width, the first circular arc section includes a first radius, and the first radius is 0.15 to 0.4 times the first width.

16. The bearing structure as claimed in claim 10, wherein a reference plane is perpendicular to a longitudinal axis of the bearing structure, a first angle is formed between the first connecting section and the reference plane, and a second angle is formed between the second connecting section and the reference plane, and the first angle is equal to the second angle.

17. The bearing structure as claimed in claim 16, wherein the sum of the first angle and the second angle ranges from 30 to 45 degrees.

18. A bearing structure for supporting a rotating shaft, the bearing structure comprising:

a plurality of wave-shaped grooves and an inner surface, wherein the wave-shaped grooves are formed on the inner surface and are configured to receive a lubricating fluid, each of the wave-shaped grooves extends along a longitudinal axis of the bearing structure, and each of the wave-shaped grooves includes:

a first peak section;

a second peak section;

two first connecting sections, connected to two sides of the first peak section;

two second connecting sections, connected to two sides of the second peak section; and a trough section, disposed between the first peak section and the second peak section, and the trough section is connected to one of the two first connecting sections and one of the two second connecting sections, wherein at least one of the first peak section, the second peak section and the trough section is a circular arc structure, wherein the first peak section includes a first apex, the second peak section includes a second apex and the trough section includes a third apex, wherein a first distance is formed between the third apex and the first apex along the longitudinal axis, a second distance is formed between the third apex and the second apex along the longitudinal axis, and wherein the trough section has a radius, and the radius is equal to 0.15 to 0.4 times the sum of the first distance and the second distance.

* * * * *